United States Patent
Mellein et al.

(10) Patent No.: US 9,060,287 B2
(45) Date of Patent: Jun. 16, 2015

(54) MEASURING DEVICE AND MEASUREMENT METHOD FOR NON-INTRUSIVE THROUGHPUT MEASUREMENT IN COMMUNICATION NETWORKS

(71) Applicant: Rohde & Schwarz GmbH & Co. KG, Munich (DE)

(72) Inventors: Heinz Mellein, Haar (DE); Carsten Sauerbrey, Rosenheim (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 111 days.

(21) Appl. No.: 13/794,162

(22) Filed: Mar. 11, 2013

(65) Prior Publication Data

US 2014/0254405 A1    Sep. 11, 2014

(51) Int. Cl.
  *G06F 11/00* (2006.01)
  *H04W 24/02* (2009.01)
  *H04W 24/00* (2009.01)
  *H04W 24/04* (2009.01)

(52) U.S. Cl.
  CPC .............. *H04W 24/02* (2013.01); *H04W 24/04* (2013.01); *H04W 24/00* (2013.01)

(58) Field of Classification Search
  CPC .............................. H04W 24/00; H04W 24/02
  USPC ........................................................ 370/252
  See application file for complete search history.

(56) References Cited

U.S. PATENT DOCUMENTS

| | | | |
|---|---|---|---|
| 2012/0087382 A1* | 4/2012 | Zhang et al. | 370/480 |
| 2012/0093016 A1* | 4/2012 | Zhang et al. | 370/252 |
| 2012/0099674 A1* | 4/2012 | Moulsley et al. | 375/296 |
| 2012/0275313 A1* | 11/2012 | Prasad et al. | 370/241 |
| 2014/0043988 A1* | 2/2014 | Chen et al. | 370/252 |
| 2014/0105121 A1* | 4/2014 | Jose et al. | 370/329 |
| 2014/0112403 A1* | 4/2014 | Falconetti et al. | 375/260 |
| 2014/0247748 A1* | 9/2014 | Kang et al. | 370/252 |
| 2014/0314166 A1* | 10/2014 | Gomadam et al. | 375/267 |

FOREIGN PATENT DOCUMENTS

EP    1282948 B1    8/2007

* cited by examiner

*Primary Examiner* — Farah Faroul
(74) *Attorney, Agent, or Firm* — Ditthavong & Steiner, P.C.

(57) ABSTRACT

A measuring device for performing measurements of a measurement signal emitted by a communication network using a plurality of resource blocks includes a digital processor with a power detector for determining a Received Signal Strength Indicator (RSSI) indicative of a received power of user data within a number of resource blocks in the measurement signal and a Reference Signal Received Power (RSRP) indicative of a received power of reference signals within a number of resource blocks in the measurement signal. The measuring device further includes a resource determiner for determining occupied and unoccupied resource blocks based on the determined RSRP and the RSSI. The resource blocks each correspond to a specific time and frequency range and each include a number of resource elements which each correspond to a specific time and frequency range.

12 Claims, 5 Drawing Sheets

MEASURING DEVICE AND MEASUREMENT METHOD FOR NON-INTRUSIVE THROUGHPUT MEASUREMENT IN COMMUNICATION NETWORKS

BACKGROUND OF THE INVENTION

The invention relates to non-intrusively measuring throughput in communication networks.

Conventionally, it is necessary to book a measuring device into a communication network as a participant within the communication network in order to perform throughput measurements. Especially, when trying to establish the maximally achievable throughput, the interior resources of the communication network are used by the measuring device. Therefore, a communication by another participant in the communication network is not possible during this throughput measurement.

For example, the European patent EP 1 282 948 B1 shows a measuring device, which participates in the communication network in order to perform measurements. The measuring device shown by the above-mentioned European patent is disadvantageous, since the network resources are blocked during the measurement.

Accordingly, a object of the invention is to provide a measuring device and a measurement method, which do not reduce the network resources available to regular participants within the communication network.

SUMMARY OF THE INVENTION

An inventive measuring device for performing measurements of a measurement signal emitted by a communication network using a plurality of resource blocks comprises digital processing means comprising power detection means for determining a received signal strength indicator RSSI indicative of a received power of user data within a number of resource blocks in the measurement signal and a reference signal received power RSRP indicative of a received power of reference signals within a number of resource blocks in the measurement signal and resource determining means for determining occupied and unoccupied resource blocks based on the determined reference signal received power RSRP and received signal strength indicator RSSI.

Preferably, the resource blocks each correspond to a specific time and frequency range and each consist of a number of resource elements which each correspond to a specific time and frequency range. It is therefore possible to estimate the achievable throughput without influencing the network.

Advantageously, the digital processing means further comprise parameter detection means for reading out a reference signal transmit power of the reference signals from the measurement signal. The resource determining means are then further set up for determining the occupied and unoccupied resource blocks based additionally on the reference signal transmit power. This increases the accuracy of the measurement.

The digital processing means advantageously further comprise channel quality information detection means for determining channel quality information based on at least one received reference signal and knowledge of a regarding transmitted reference signal. This even more increases the accuracy of the measurement.

Even more advantageously, the digital processing means further comprise modulation estimation means for estimating a modulation scheme used by the communication network based on the determined channel quality information. Also this serves the purpose of increasing measurement accuracy.

In a further advantageous embodiment, the digital processing means further comprise precoder entry estimation means for estimating an optimal precoder entry based on the channel quality information and modulation estimation means for estimating a modulation scheme used by the communication network based on the determined channel quality information and the estimated precoder entry. This also allows for an increased measurement accuracy.

Advantageously, the digital processing means further comprise parameter detection means for reading out a reference signal transmit power of the at least one reference signal from the measurement signal, precoder entry estimation means for estimating an optimal precoder entry based on the channel quality information and based on the reference signal transmit power and modulation estimation means for estimating a modulation scheme used by the communication network based on the determined channel quality information and the estimated precoder entry. This also increases the accuracy of the measurement.

In an alternative embodiment, the digital processing means further comprise precoder entry estimation means for estimating an optimal precoder entry based on the channel quality information, modulation estimation means for estimating a modulation scheme used by the communication network based on the determined channel quality information and the estimated precoder entry and MIMO usefulness determination means for determining a MIMO throughput gain based on the estimated precoder entry and the estimated modulation scheme. This embodiment also has increased measurement accuracy.

Alternatively, the digital processing means further comprise parameter detection means for reading out a reference signal transmit power of the at least one reference signal from the measurement signal, precoder entry estimation means for estimating an optimal precoder entry based on the channel quality information and based on the reference signal transmit power, modulation estimation means or estimating a modulation scheme used by the communication network based on the determined channel quality information and the estimated precoder entry and MIMO usefulness determination means for determining a MIMO throughput gain based on the estimated precoder entry and the estimated modulation scheme. An increase in measurement accuracy is also the case, here.

Advantageously, the measuring device only receives a measurement signal from the communication network and/or does not transmit any signals to the communication network and/or is no active participant in the communication network and/or does not influence the communication network in any way. This reduces the strain on the target communication network.

An inventive measuring method serves the purpose of performing measurements of a measurement signal emitted by a communication network using a plurality of resource blocks. A received signal strength indicator RSSI indicative of a received power of user data within a number of resource blocks in the measurement signal and a reference signal received power RSRP indicative of a received power of reference signals within a number of resource blocks in the measurement signal are determined. Occupied and unoccupied resource blocks are determined based on the determined reference signal received power RSRP and received signal strength indicator RSSI. The resource blocks each correspond to a specific time and frequency range and each consist of a number of resource elements which each correspond to a specific time and frequency range. This allows for rough throughput estimation without influencing the network.

BRIEF DESCRIPTION OF THE DRAWINGS

An exemplary embodiment of the invention is now further explained with respect to the drawings, in which.

First we demonstrate the mathematics and the general concept underlying the exemplary embodiment with respect to FIGS. 1-2. In a second step, the function of an exemplary inventive device is shown with respect to FIGS. 3-4. Finally, the function of an embodiment of the inventive method is shown along FIG. 5. Similar entities and reference numbers in different figures have been partially omitted.

DETAILED DESCRIPTION OF THE PREFERRED EMBODIMENTS

First Embodiment

Figure 1:
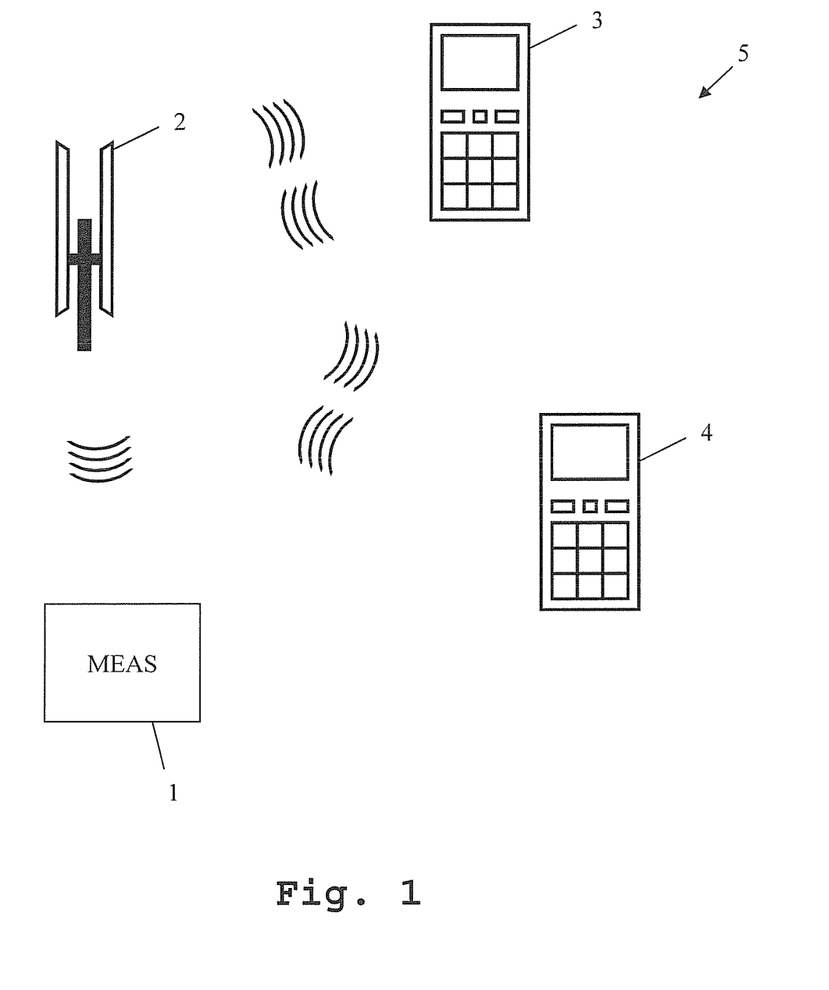
FIG. 1 shows an exemplary communication network.

FIG. 1 shows an exemplary communication network 5. The communication network 5 comprises a basestation 2, a first mobile telephone 3 and a second mobile telephone 4. The basestation 2 communicates wirelessly with the first mobile phone 3 and the second mobile phone 4. During this communication, the basestation 2 sends out transmissions and receives transmissions.

The communication from the basestation 2 to the mobile telephone 3 and to the mobile telephone 4 each uses a certain part of the available resources for performing transmissions within the communication network 5.

An inventive measuring device 1 is present but not part of the communication network 5. The measuring device 1 merely receives transmissions from the basestation 2. The basestation 2 is not aware of the presence of the measuring device 1. The communications received by the measuring device 1 are therefore not intended for the measuring device 1 but correspond to transmissions from the basestation 2 to participants of the communication network 5, e.g. the mobile telephone 3 or the mobile telephone 4.

Figure 2:
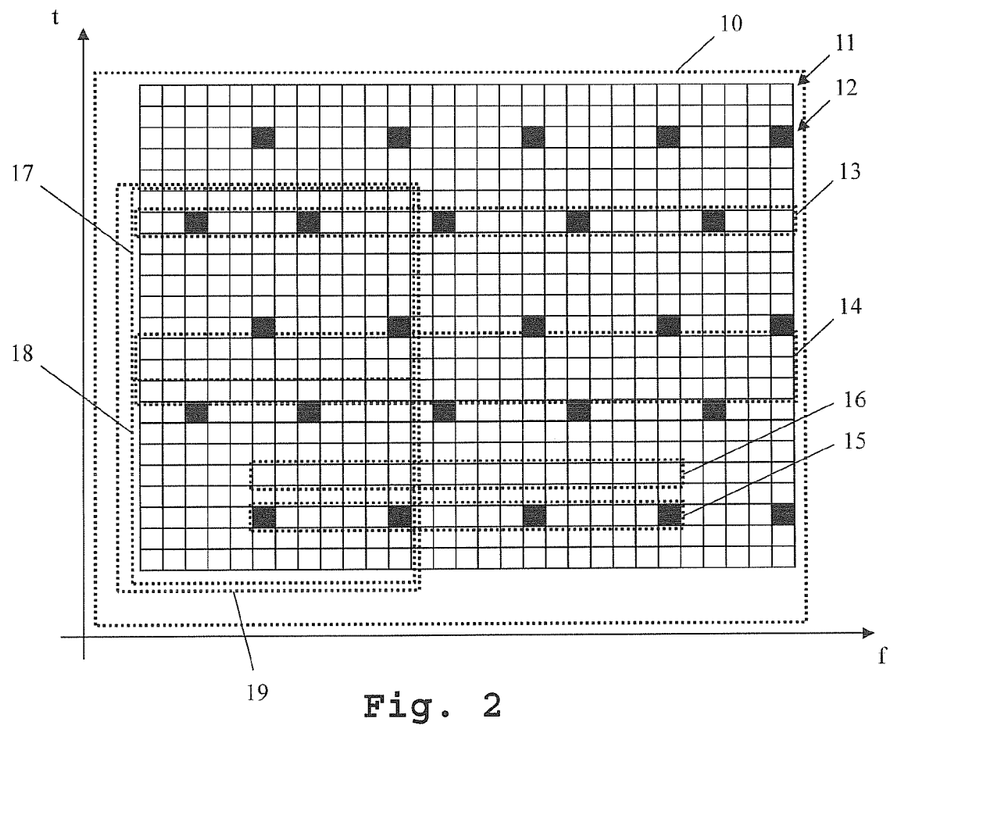
FIG. 2 shows a time-frequency diagram of basestation transmissions in an exemplary communication network.

In FIG. 2 an exemplary time-frequency diagram of resources used by a communication network is shown. A plurality of resource elements 10 is shown. Each of the depicted blocks corresponds to one resource element 10. White blocks correspond to user data resource elements 11. Black blocks correspond to reference signals 12. The position of the reference signals 12 within the time-frequency diagram are fixed by the employed communication standard. Also, the content of each of the reference signals 12 is specified by this standard.

Each resource element 10 corresponds to a certain frequency section during a certain time interval. The entire frequency- and time-range used for the transmissions in the communication network are divided into frames and sub-frames. One sub-frame 19 is depicted here. The sub-frame 19 again is divided into resource blocks 17, 18. A resource block is the smallest unit, which is allocated to a specific transmission from the basestation to a participant within the communication network. In order to determine the network capacity and the throughput, the use of different resource blocks is analyzed.

In order to analyze the transmissions in the communication network, a number of different parameters can be extracted from the time-frequency diagram. A wide band reference signal received power WB RSRP 13 can be extracted. This parameter comprises the received power of all of the reference signals within the area labeled as 13 within FIG. 2. The wide band reference signal received power WB RSRP corresponds to the power of all reference signals over the entire employed bandwidth in the duration of a single resource element, during which reference signals are transmitted. Moreover, a reference signal received power RSRP can be derived from the time-frequency diagram. It corresponds to the power of all reference signals in the area labeled as 15. The reference signal received power RSRP 15 corresponds to the wide band reference signal received power WB RSRP, but in a narrower bandwidth. In this example, only four resource elements comprising reference signals are situated within the area labeled as 15. Regarding the wide band reference signal received power 13 and the reference signal received power 15, it is important to state that only the reference signals within the areas indicated in FIG. 2 are relevant. The user data resource elements within these areas are not taken into consideration.

Moreover, the time-frequency diagram depicted in FIG. 2 shows a wide band received signal strength indicator WB RSSI 14. The area indicated as 14 also corresponds to the entire employed bandwidth. Again a narrow band version, a received signal strength indicator RSSI 16 can also be derived from the time-frequency diagram shown in FIG. 2.

Since the entire time- and frequency-range used by the basestation of the communication network is subdivided into resource blocks 17, 18, the available network resources can easily be judged by determining the number of resource blocks presently in use.

By determining the above described parameters, it is possible to judge, how many resource blocks are presently in use. The knowledge of the number of occupied and non-occupied resource blocks though, does not suffice for determining the maximally achievable throughput and the presently available throughput, since modern communication standards allow the use of different modulation schemes and the use of different MIMO settings. Therefore, it is necessary to determine these parameters in order to reach even more accurate results.

In an exemplary embodiment, the employed communication standard is LTE. The power notation in LTE is defined as energy per resource element EPRE. EPRE is the energy contained in one resource element of the OFDM symbol, before the cyclic prefix is inserted. The power is usually given in EPRE in the specifications and the unit of EPRE is $$\left[\frac{dbm}{15 \text{ kHz}}\right].$$

In order to gain the total transmit power, the number of allocated resource blocks due to the utilized bandwidth has to be taken into account additionally. Since every resource block contains twelve subcarriers, the total power is given by $$P_{total} = 12 \cdot N_{RB} \cdot 10^{\frac{EPRE}{10 \, dBm/15 \, kHz}}$$

The number of wakened resource blocks can be estimated by the total received power RSSI and the reference symbol received power RSRP. The number of occupied resource blocks $O_{RB}$ is as follows:

$$O_{RB} = \frac{10^{\frac{RSSI-RSRP}{10\ dBm/15\ kHz}}}{12} \qquad (1)$$

The number of vacant resource blocks $V_{RB}$ can be obtained by the subtraction of $O_{RB}$ from the total number of resource blocks $N_{RB}$ within the utilized bandwidth.

$$V_{RB} = N_{RB} - O_{RB} \qquad (2)$$

The throughput of closed spatial multiplexing though depends on the best matching precoding. LTE utilized a code book in order to save signaling bits. Thus, the optimum precoder entry has to be determined in order to increase the throughput. The best precoder can be chosen from all possible precoders W by maximizing the pre-equalization mutual information I per N resource blocks which can be obtained by $$W_j = \underset{W_i \in W}{\arg\max} \sum_{k=1}^{N} I_k(W_i) \qquad (4)$$

Due to the application of detectors, the post-equalization mutual information can be obtained by $$I_k = \sum_{l=1}^{L} \log_2(1 + SINR_{k,l}) \qquad (5)$$

where L is the number of spatial layers and $SINR_{k,l}$ is the SINR at layer l and subcarrier k.

Open loop spatial multiplexing for 2×2 configuration does not need any precoder determination because it is fixed to entry zero of the codebook. For a higher number of antennas, the precoder entry has to be ascertained.

In order to further increase the accuracy of the throughput estimation, the modulation and coding scheme (MCS) is determined out of the channel state information in order to increase the throughput as well as the reliability. Since there are just small throughput improvements due to frequency-dependent MCS but higher computing effort, all resource blocks allocated to one using utilize the same MCS. Thus, it focuses on the block error rate (BLER) for a certain signal to interference and a noise ratio (SINR) out of the channel condition. Due to separate SINRs for every resource block, the block error rate for every resource block has to be evaluated. In order to reduce computing effort, the number of SINR has to be mapped on one scalar value. Hence, a wide band modulation scheme will be gained.

The frequency averaged SINR is not very accurate and the BLER curve can deviate highly from individual path BLER curves. Thus, the mapping is done by a link to system performance mapping, which compresses the SINR values to the AWGN channel domain. The Exponential Effective SNR Mapping (EESM) is a technique which is utilized in LTE and the effective SINR for N OFDMA subcarriers and $SINR_k$ at the $k^{th}$ subcarrier can be computed by $$SINR_{eff} = -\ln\left(\frac{1}{N}\sum_{k=0}^{N-1} e^{-\frac{SINR_k}{\beta}}\right) \qquad (6)$$

where β adjusts the SINR to match a specific MCS. For QPSK, β is set to two. β-values for certain modulation and coding schemes are known in the art. Nevertheless, no values are available for uncoded 16-QAM and 64-QAM. Thus, the β-value has to be trained by link-level simulations.

Since each modulation and coding scheme (MCS) entry provides a certain transport block size (TBS), the EESM β-value cannot be trained because uncoded transmit symbols have no specified TBS. Instead, the total RE capacity of the transmission time interval (TTI) will be applied. Thus, a TBS independent compression method has to be utilized. The uncoded bit error rate (BER) provides a TBS adaptive MCS decision algorithm. The uncoded BER averages over all uncoded bit error probabilities of $N_c$ subcarriers. The uncoded BER can be obtained by $$uncodedBER = \frac{1}{N_c}\sum_{k=1}^{N_c} BER[SINR(k)] \qquad (7)$$

where BER[SINR (k)] is the SINR dependent BER at subcarrier k for a given modulation. Additionally, a correction factor β was introduced in order to enhance the accuracy of the BLER estimation and to match uncoded BER as much as possible to the AWGN BLER, like in EESM. The extended uncoded BER can be computed by $$uncodedBER = \frac{1}{N_c}\sum_{k=1}^{N_c} BER\left[\frac{SINR(k)}{\beta}\right]^{\sqrt{\beta}} \qquad (8)$$

The β-value training is identical to the link-level simulations for the EESM correction factor. The computation can be accelerated by a look-up-table for the uncoded BER. The BLER estimation considers independent bit errors. Thus, the BLER can be calculated by $$BL\tilde{\ }ER = 1 - (1-BER)^{BL} \qquad (9)$$

where BL is the block length in bits. Due to non disjoint error probabilities, the BL~ER has to be modified. Thus, BL~ER for a certain TBS will be scaled by a reference block length $BL_{ref}$ which $BLER_{ref}$ will be calculated.

$$BL\tilde{\ }ER = 1 - (1-BLER_{ref})^{\frac{BL}{BL_{ref}}} \qquad (10)$$

The reference block length will be defined as number of bits per TTI for one RB=m·160, where m is the number of bits per symbol.

The chosen channel model for the link-level simulation is the ITU Extended Vehicular A (EVA) channel with a speed of 70 km/h. The EVA channel model contains the following taps with average attenuation and delay which are depicted in the following table. The classical Doppler spectrum is utilized.

The simulation conditions are
SISO transmission
ITU EVA model with velocity of 70 km/h 50 independent channel realizations
50 noise realizations
Ideal channel estimation
No interference
Interleaving The goal of the simulation is a minimized error between the simulated BLER and the estimated BLER in order to match the AWGN BLER as much as possible. Thus, the function $$\beta = \underset{\beta}{\operatorname{argmin}} \frac{1}{N_c N_s} \sum_{k=1}^{N_s} \sum_{n=1}^{N_c} |\log_{10}(BLER_{sim}(H_n, \sigma_k^2)) - \log_{10}(BLER_{est}(H_n, \sigma_k^2, \beta_l))|^2 \quad (4.11)$$

needs to be minimized. H denotes the channel realization, $\sigma$ is the noise variance and $\sigma_k^2$ depicts the utilized calibration factor of the vector $\beta=[\beta_1, \ldots \beta_1, \ldots \beta_N]$.

| Tap | Excess tap delay (ns) | Relative power (dB) |
|---|---|---|
| 1 | 0 | 0.0 |
| 2 | 30 | −1.5 |
| 3 | 150 | −1.4 |
| 4 | 310 | −3.6 |
| 5 | 370 | −0.6 |
| 6 | 710 | −9.1 |
| 7 | 1090 | −7.0 |
| 8 | 1730 | −12.0 |
| 9 | 2510 | −16.9 |

The post-detection SINR for SISO channels can be obtained by $$SINR = \frac{P|h|^2}{N_0 + I} \quad (12)$$

where P is referring to the average received power, $N_0$ is the background noise and $|h|^2$ denotes the fading channel gain. The interference power I will be set to zero because no interference is assumed.

The evaluated β-value training for this scenario does not provide accurate simulated BLER values as well as β-values. In order to increase accuracy, a high number of channel and noise realizations has to be taken into account in order to average the EVA channel model sufficiently. At least 10,000 radio frames have to be transmitted in order to gain significant results. Thus, 0-value was not ascertained for each modulation alphabet and the unbiased equation (7) will be applied because the estimated computing time for 100,000 transmitted subframes was too high with this simulation setup. Nevertheless, the β-value improves accuracy of the BLER estimation and should be implemented in a further algorithm review.

The ergodic capacity is not an adequate estimation for the throughput due to utilized discrete symbol alphabets and a detector perturbated MIMO channel. Thus, the mutual information for each applied symbol alphabet and degraded channel has to be calculated in order to approach the real world signalization. Furthermore, the outage capacity was chosen in order to give consideration to block fading.

The MMSE equalizer was chosen as an adequate detector, due to its effortless implementation and higher compensation in lower SNR ranges compared to the ZF approach.

The effective channel of the detector can be represented as $$H_e = \operatorname{diag}\{\operatorname{diag}\{G \cdot H\}\} \quad (13)$$

where $$G = \left(HH^H + \frac{n_T N_0}{E_s} I_{n_T}\right)^{-1} H^H$$

with $N_0 = 2\sigma_n^2$. $E_S$, is the energy per transmit hypersymbol $c=[c_1, \ldots, c_{n_T}]$, which consists of complex modulation symbols ci per antenna out of QPSK, 16-QAM and 64-QAM. The constellation alphabet will be denoted as A and M is the cardinality $|A|=2^m$, where m is the number of bits. Furthermore, the residual interference will be taken into account as additional noise, which leads to the noise correlation matrix $$R_n = \frac{E_s}{n_T}(GH - H_e)(GH - H_e)^H + N_0 GG^H \quad (14)$$

The capacity of a MMSE detector is given by $$C(H) = \sum_{i=1}^{n_T} \log_2\left(1 + \frac{|H_e(i, i)|^2 E_s}{n_T R_n(i, i)}\right) \text{ bit/s/Hz} \quad (15)$$

where diagonal elements of $H_e$, and $R_n$ will be used. If discrete symbol alphabets will be utilized, the total mutual information has to be calculated for each SISO stream i by $$I(c, y | H) = \sum_{i=1}^{n_T} I(c_i, y_i | H_e(i, i)) \text{ bit/s/Hz} \quad (16)$$

where $$I(c_i, y_i | H_e(i, i)) = H(c_i) - H(c_i | y_i, H_e(i, i)) \quad (17)$$

Due to equally probable transmit hypersymbols, the entropy is denoted by $H(c_i)=\log_2(M)$. The conditional entropy is given by $$H(c_i | y_i, H_e(i, i)) = E_{c,y}\left\{\log_2\left(\frac{\sum_{c \in A} p(y_i | c_i, H_e(i, i))}{p(y_i | c_i, H_e(i, i))}\right)\right\} \quad (18)$$

with $$p(y_i | c_i, H_e(i, i)) = \frac{1}{2\pi\sigma_{e,i}^2} \exp\left(-\frac{\|y_i - H_e(i, i)c_i\|^2}{2\sigma_{e,i}^2}\right) \quad (19)$$

where $2\sigma_{e,i}^2 = R_n(i,i)$.

A spatially uncorrelated full rank Rayleigh MIMO channel was considered. Due to hardware constraints, the number of channel realizations for the simulation could be just considered up to 10 million samples. Thus, the averaging could not smooth the values enough and statistical spikes could occur.

However, calculating the mutual information is a high computing effort. Thus a simple calculation for the symmetric capacity, which is often referred to the channel capacity of a finite symbol alphabet is supplied. Furthermore, several channel conditions, like Rayleigh or Rician channels were investigated. Hence, the symmetric capacity for Rayleigh channels will be focused, because MIMO transmission profits from rich scattering environments. The ergodic capacity can be gained by $$C_{Rayleigh}(\overline{SNR}, a, b) = \frac{a}{1 + (b \cdot \overline{SNR})^{-1}} \text{ bit/s/Hz} \quad (20)$$

where $\overline{SNR}$ is the average of the instantaneous SNR of the fading channel, $a=\log_2(M)$ and b is a constellation dependent approximating parameter which is shown in the following table. In order to obtain the outage capacity, the instantaneous SNR will be used.

Approximation parameter for the different constellations

| Modulation | QPSK | 16-QAM | 64-QAM |
|---|---|---|---|
| | 0.6573 | 0.2116 | 0.0866 |

In order to apply the symmetric capacity to spatial multiplexing, equation 20 will be extended and the total capacity can be obtained by $$C_{MIMO} = \sum_{l=1}^{L} C_{Rayleigh}(SINR_l, a, b) \text{ bit/s/Hz} \quad (21)$$

where a and b depending on the determined MCS and $SINR_l$ is the computed SINR for each spatial layer.

The approximation for a SISO channel is very accurate for QPSK and becomes very coarse for higher modulation schemes. Thus, the estimation for higher modulation schemes is too pessimistic for lower SINR range and too optimistic for higher SINR range until it converts. Therefore, the total deviation for a MIMO channel has to be calculated in order to determine the accuracy of the algorithm. The difference between the mutual information obtained by equation 17 and the symmetric capacity formula 21 has to be ascertained for identical MCS's at each layer. Thus, the deviation will be computed for a simulated Rayleigh channel in order to appraise the feasibility for operational measurements.

The deviation between equation 16 and equation 21 for the outage capacity will be ascertained by 10 million simulated channel realizations and evaluated for each SNR step from −20 dB until 60 dB. The error for each SNR step will be calculated and due to the low smoothing effect at the mutual information, the error between mutual information and symmetric capacity could just be estimated.

The error was just ascertained for uncorrelated Rayleigh channels because various correlated channel conditions have to be evaluated. By the reason of the evaluation effort due to the high number of channel realizations, the error caused by the correlation was not appraised. Furthermore, due to utilization of cross-polarized antennas at receiver side for the measurements as well as at eNodeB side, the correlation influence is extremely reduced and thus negligible.

The error estimation can be interpreted as a very pessimistic capacity estimation in the lower $E_s/N_0$ range due to the positive error. Furthermore, in higher $E_s/N_0$ range, the error converts to zero. Thus, the symmetric capacity is under the actual capacity in lower $E_s/N_0$ range and approaches the actual capacity in higher $E_s/N_0$ range. Due to the fact, that the actual capacity was never exceeded, the symmetric capacity is an adequate but pessimistic estimation for the throughput.

Nevertheless, the Rayleigh channel assumption does not hold in every propagation scenario. Thus, there could occur deviations in real world measurements. In order to compensate these deviations, the channel statistic has to be analyzed and the channel type extracted, e.g. Rayleigh or Nakagami channel. Afterwards, it is possible to adapt equation 20. Furthermore, a lookup-table multiplication with the reciprocal error cannot be realized because of a unknown compensation effect due to several different channel conditions compared to the uncorrelated Rayleigh MIMO channel.

The adequate MIMO mode will be determined by the condition number as a threshold in order to provide reliability or high data rate. The CN indicates the approachable capacity due to the spread of the channel matrix H singular values. It is defined as $$\frac{\max_i \lambda_i}{\min_i \lambda_i}$$

where $\lambda_i$ are the eigenvalues of $HH^H$. Thus, the CN will be evaluated and a satisfactory threshold determined.

An empiric gained statement about the applicable MIMO channel due to the evaluated CN in dB is supplied. MIMO channels with a CN of 0-10 dB are well conditioned for spatial multiplexing. The MIMO channel becomes unfeasible, if the CN exceeds 20 dB. Therefore, the CN threshold was set to 20 dB and beyond this threshold, receive beamforming (SIMO) will be applied. The throughput will be estimated by the channel capacity for SIMO channels $$C_{SIMO} = \log_2\left(1 + \frac{P\|h\|^2}{N_0}\right) \text{ bit/s/Hz} \quad (22)$$

where P is the average energy per transmit symbol. In order to satisfy the finite discrete constellation alphabet, equation 20 will be utilized with $\|SINR\|_1$, where $SINR=[SINR_1, SINR_2, \ldots, SINR_n]$ is a vector, containing the SINR per antenna and $\|\cdot\|_s$ denotes the sum of the SINR.

$$C_{SIMON,Rayleigh} = \frac{a}{1 + (b \cdot \|SINR\|_s)^{-1}} \text{ bit/s/Hz} \quad (23)$$

The sum of the SINR can be applied for non interfered or equal interfered received signal because the SIMO channel capacity depends on the euclidean norm of the channel and equivalent Utilizing equation 12 with constant interference I, $$\frac{P\|h\|^2}{N_0 + I} = \frac{P|h_1|^2}{N_0 + I} + \ldots + \frac{P|h_n|^2}{N_0 + I} = SINR_1 + \ldots + SINR_n$$

where n is the number of receive antennas. Due to small antenna spacings, the interference power could be assumed as almost equal at each antenna. Furthermore, cellular networks and network operator optimizations will minimize the interference power and therefore, the sum of the SINR is a good estimation for the symmetric capacity of SIMO channels.

Figure 3:
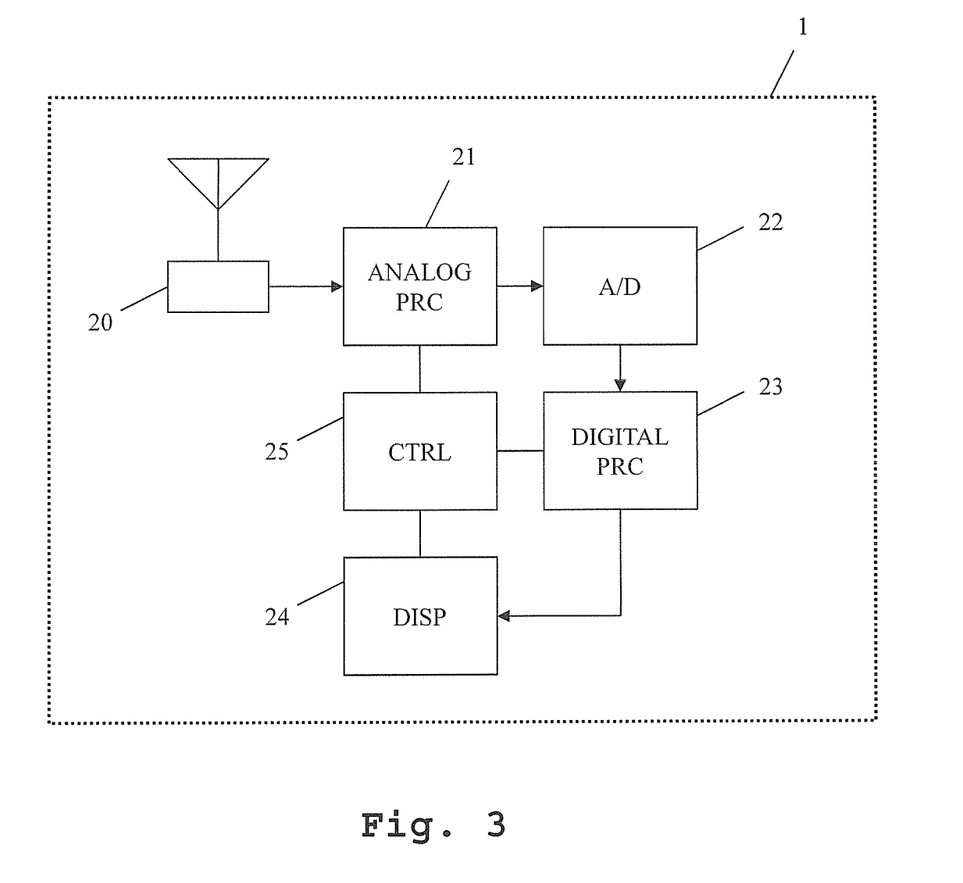
FIG. 3 shows an embodiment of the inventive measuring device in a block diagram.

In FIG. 3, an exemplary embodiment of the inventive measuring device 1 is depicted. The measuring device 1 comprises an antenna 20, analog processing means 21, an analog-digital-converter 22, digital processing means 23 and a display 24. The components 20-24 are connected to each other in the above-specified order. Moreover, the analog processing means 21, the digital processing means 23 and the display 24 are connected to control means 25, which control the respective means.

The antenna 20 receives a signal transmitted by a basestation, e.g. the basestation 2 of FIG. 1. The resulting signal is passed on to the analog processing means 21 and pre-processed thereby. For example an amplification and a noise reduction are performed. Moreover, a frequency reduction to the baseband is performed here. The resulting signal is passed on to the analog-digital-converter 22, which converts the signal into a digital signal. The digital signal is passed on to the digital processing means 23, which perform the actual measurements. The digital processing means 23 are shown in more detail in FIG. 4. The results of the digital processing means 23 are passed on to the display 24, which depicts them.

Figure 4:
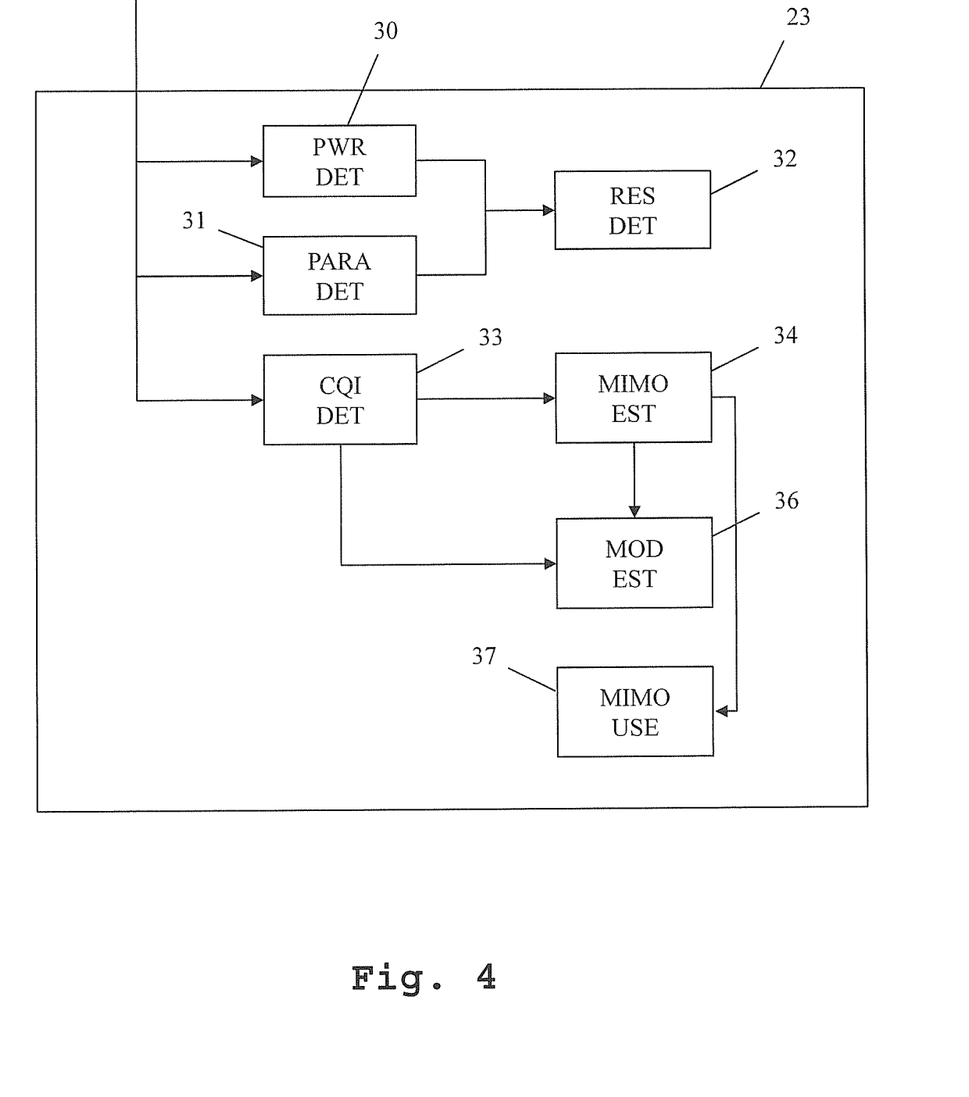
FIG. 4 shows a detail of the embodiment of the inventive measuring device in a block diagram.

In FIG. 4 the digital processing means 23 of the measuring device 1 of FIG. 3 is shown in greater detail. The digital processing means 23 comprise power detection means 30, parameter detection means 31 and channel quality information detection means 33, which each are connected to the signal received from the analog-digital-converter 22 of FIG. 3. Outputs of the power detection means 30 and the parameter detection means 31 are connected to resource detection means 32. The channel quality information detection means 33 moreover are connected to precoder entry estimation means 34 and to modulation estimation means 36. The precoder entry estimation means 34 again are connected to MIMO usefulness determination means 37.

The digitized received signal of the basestation 2 of FIG. 1 in the baseband is supplied to the power detection means 30, the parameter detection means 31 and the channel quality information detection means 33. The power detection means 30 determines the different parameters shown along FIG. 2. From these parameters, the resource detection means 32 can determine how many resource blocks are in use. In order to increase accuracy, further power parameters can be measured by the power detection means 30. The power detection means 30 can furthermore determine a reference signal received power of at least one reference signal within the received measurement signal. Also the use of more than one reference signal received power is possible.

The parameter detection means 31 furthermore read out a reference signal transmit power of the reference signals 12 of FIG. 2 from the measurement signal. This parameter is transmitted by the basestation. The occupied and unoccupied resource blocks are determined additionally based on the reference signal transmit power read out from the signal.

The digital baseband signal is furthermore supplied to the channel quality information determination means 33. Channel quality information is determined by the channel quality information determination means 33. From this channel quality information, the precoder entry estimation means 34 determine a probable precoder entry used for MIMO transmission. This is done by checking for each possible precoder entry, if maximum transmission throughput is achieved.

From the channel quality information and from the estimated precoder entry, the modulation estimation means 36 furthermore estimates, which modulation scheme is probably used by the basestation for the resource blocks. For a low quality of the transmission channel, a modulation scheme using a lower number of different symbols would probably be used then for a transmission channel of a high quality.

The precoder entry estimation means 34 and the modulation estimation means 36 can determine the precoder entry and the employed modulation scheme individually for each resource block or determine only one precoder entry and one modulation scheme for all resource blocks.

Also, the precoder entry estimation means 34 are not absolutely necessary for using the modulation estimation means 36. Independent of the precoder entry, based upon a signal to noise ratio, it is possible to estimate the employed modulation scheme. This results in a less accurate measurement, though.

The MIMO usefulness determination means 37 are furthermore set up for determining, if the precoder entry estimated by the precoder entry estimation means 34 actually leads to an improvement in throughput in comparison to a transmission not using MIMO. For this determination, the MIMO usefulness determination means 37 employs the estimated precoder entry.

Second Embodiment

Figure 5:
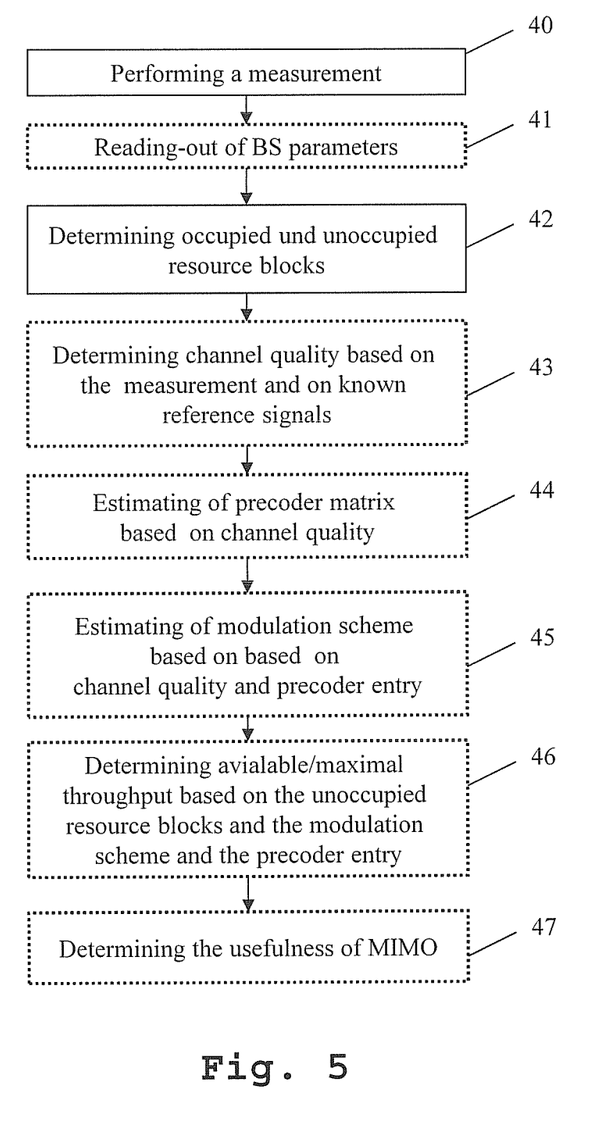
FIG. 5 shows an embodiment of the inventive measurement method.

In FIG. 5 an exemplary embodiment of the inventive method is depicted. In a first step 40, a measurement of a received signal of the basestation is performed. In a second step 41, parameters of the basestation are read out. The second step 41 though is only optional. In a third step 42, occupied and unoccupied resource blocks are detected based upon the measurement and optionally based upon the parameters. In a fourth step 43, channel quality information is determined based on the measurement and on known reference signals. Also this step is merely optional. In a fifth step 44, a precoder matrix entry is estimated based on the channel quality information. This estimation can be performed for each resource block or can be performed once for all resource blocks. Also this step is optional. Moreover, in a sixth step 45, a modulation scheme is estimated based on the channel quality and optionally based upon the estimated precoder matrix entry. Also this step is optional. In an optional seventh step 46, an available and/or a maximal throughput is determined based upon the unoccupied and occupied resource blocks, on the modulation scheme and on the precoder entry. Finally, in an optional eighth step 47, the usefulness of the MIMO transmission is determined.

The invention is not limited to the examples and especially not to a specific communication standard. Although the invention is described along typical parameters of the LTE standard, also different standards like OMTS, GSM, general CDMA base standards etc. are easily covered by the present invention. The characteristics of the exemplary embodiments can be used in any combination.

TABLE OF ABBREVIATIONS

3GPP 3rd Generation Partnership Project
AWGN Additive White Gaussian Noise
bps Bit per second
BER Bit Error Rate
BLER Block Error Rate
CDD Cyclic Delay Diversity
CN Condition Number
CQI Channel Quality Indicator
DFT Discrete Fourier Transform
eNodeB evolved NodeB
EESM Exponential Effective SINR Mapping
EPRE Energy per Resource Element
EVA Extended Vehicular A
FDD Frequency Division Duplex
GPS Global Position System
HARQ Hybrid Automatic Repeat-reQuest
ITU International Telecommunication Union LTE UMTS Long Term Evolution
MATLAB MathWorks MATLAB®
MCS Modulation and Coding Scheme
MIMO Multiple Input Multiple Output
MMSE Minimum Mean Square Error
OFDM Orthogonal Frequency Division Multiplexing
OFDMA Orthogonal Frequency Division Multiplexing Access
PMI Precoding Matrix Indicator
QAM Quadrature Amplitude Modulation
QPSK Quadrature Phase Shift Keying
RB Resource Block
RE Resource Element
RI Rank Indicator
RS Reference Signal
SFBC Space Frequency Block Codes
SIMO Single Input Multiple Output
SINR Signal to Interference and Noise ratio
SISO Single Input Single Output
SNR Signal to Noise ratio
TB Transport Block
TBI Transport Block Indicator
TBS Transport Block Size
TTI Transmit Time Interval
UE User equipment
UMTS Universal Mobile Telecommunications System

The invention claimed is:

1. Measuring device for performing measurements of a measurement signal emitted by a communication network using a plurality or resource blocks, comprising digital processing means, the device comprising:
    power detection means for determining a received signal strength indicator indicative of a received power of user data within a number of resource blocks in the measurement signal and a reference signal received power indicator indicative of a received power of reference signals within a number of resource blocks in the measurement signal;
    resource determining means for determining occupied and unoccupied resource blocks based on the determined reference signal received power and received signal strength indicator;
    channel quality information detection means for determining channel quality information based on at least one received reference signal;
    precoder entry estimation means for estimating an optimal precoder entry based on the channel quality information;
    modulation estimation means for estimating a modulation scheme used by the communication network based on the determined channel quality information and the estimated precoder entry, and
    Multiple-Input Multiple-Output (MIMO) usefulness determination means for determining a MIMO throughput gain based on the estimated precoder entry and the estimated modulation scheme.

2. Measuring device according to claim 1,
wherein the resource blocks each correspond to a specific time and frequency range and each include a number of resource elements which each correspond to a specific time and frequency range.

3. Measuring device according to claim 1,
wherein the digital processing means further comprise:
parameter detection means for reading out a reference signal transmit power of the reference signals from the measurement signal; and
    wherein the resource determining means are further set up for determining the occupied and unoccupied resource blocks based additionally on the reference signal transmit power.

4. Measuring device according to claim 1,
wherein the digital processing means further comprise:
parameter detection means for reading out a reference signal transmit power of the at least one reference signal from the measurement signal.

5. Measuring device according to claim 1,
wherein at least one of the following occurs:
    the measuring device only receives a measurement signal from the communication network;
    the measuring device does not transmit any signals to the communication network:
    the measuring device is no active participant in the communication network; and
    the measuring device does not influence the communication network in any way.

6. Measuring device for performing measurements of a measurement signal emitted by a communication network using a plurality or resource blocks, comprising digital processing means, the device comprising:
    power detection means for determining a received signal strength indicator indicative of a received power of user data within a number of resource blocks in the measurement signal and a reference signal received power indicator indicative of a received power of reference signals within a number of resource blocks in the measurement signal;
    resource determining means for determining occupied and unoccupied resource blocks based on the determined reference signal received power and received signal strength indicator;
    channel quality information detection means for determining channel quality information based on at least one received reference signal;
    parameter detection means for reading out a reference signal transmit power of the at least one reference signal from the measurement signal;
    precoder entry estimation means for estimating an optimal precoder entry based on the channel quality information and based on the reference signal transmit power;
    modulation estimation means or estimating a modulation scheme used by the communication network based on the determined channel quality information and the estimated precoder entry, and
    Multiple-Input Multiple-Output (MIMO) usefulness determination means for determining a MIMO throughput gain based on the estimated precoder entry and the estimated modulation scheme.

7. Measuring method comprising:
performing measurements of a measurement signal emitted by a communication network using a plurality of resource blocks,
    wherein a Received Signal Strength Indicator (RSSI) indicative of a received power of user data within a number of resource blocks in the measurement signal and a reference signal received power indicative of received power of reference signals within the number of resource blocks in the measurement signal are determined; and
    wherein occupied and unoccupied resource blocks are determined based on the determined reference signal received power and the RSSI;
    wherein channel quality information is determined based on at least one received reference signal;

wherein an optimal precoder entry is determined based on the channel quality information;
wherein a modulation scheme used by the communication network is determined based on the determined channel quality information and the estimated precoder entry, and
wherein a Multiple-Input Multiple-Outlet (MIMO) throughput gain is determined based on the estimated precoder entry and the estimated modulation scheme.

8. Measuring method according to claim 7, wherein the resource blocks each correspond to a specific time and frequency range and each includes a number of resource elements which each correspond to a specific time and frequency range.

9. Measuring method according to claim 7,
wherein a reference signal transmit power of the reference signals is read out from the measurement signal; and
wherein the occupied and unoccupied resource blocks are determined additionally based on the reference signal transmit power.

10. Measuring method according to claim 7,
wherein a reference signal transmit power of the at least one reference signal is read out from the measurement signal.

11. Measuring method according to claim 7,
wherein at least one of the following occurs:
the measurement signal is only received from the communication network;
no signals are transmitted to the communication network;
no active participation in the communication network occurs; and,
the communication network is not influenced in any way.

12. Measuring method comprising:
performing measurements of a measurement signal emitted by a communication network using a plurality of resource blocks,
wherein a Received Signal Strength Indicator (RSSI) indicative of a received power of user data within a number of resource blocks in the measurement signal and a reference signal received power indicative of received power of reference signals within the number of resource blocks in the measurement signal are determined; and
wherein occupied and unoccupied resource blocks are determined based on the determined reference signal received power and the RSSI;
wherein channel quality information is determined based on at least one received reference signal;
wherein a reference signal transmit power of the at least one reference signal is read out from the measurement signal;
wherein an optimal precoder entry is determined based on the channel quality information and based on the reference signal transmit power;
wherein a modulation scheme used by the communication network is determined based on the determined channel quality information and the estimated precoder entry, and
wherein a Multiple-Input Multiple-Outlet (MIMO) throughput gain is determined based on the estimated precoder entry and the estimated modulation scheme.

* * * * *